Figure 1:
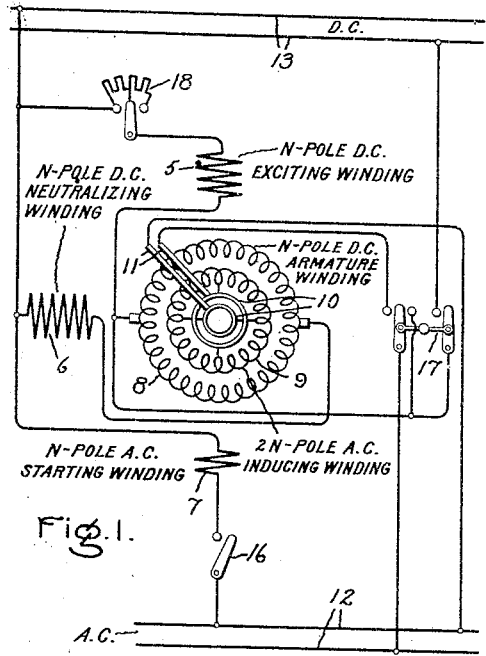

W. C. KORTHALS-ALTES.
CONVERTER.
APPLICATION FILED DEC. 22, 1917.

1,371,908.

Patented Mar. 15, 1921.

Inventor:
Willem C. Korthals-Altes,
by
His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

CONVERTER.

1,371,908. Specification of Letters Patent. Patented Mar. 15, 1921.

Application filed December 22, 1917. Serial No. 208,507.

*To all whom it may concern:*

Be it known that I, WILLEM C. KORTHALS-ALTES, a subject of the Queen of The Netherlands, residing at Schenectady, county of Schenectady, State of New York, have invented certain new and useful Improvements in Converters, of which the following is a specification.

My invention relates to converters and particularly to induction converters for converting alternating current electric energy into direct current electric energy, and vice versa, and has for its object the provision of an improved induction converter of this character. Other objects of the invention will be brought out in the course of the following description.

The induction converter comprises an induction machine having primary and secondary windings and a direct current machine having exciting and armature windings mechanically and electrically combined in a single dynamo-electric machine. If this machine is supplied with alternating current energy, the induction component operates electrically as an induction motor while the direct current component operates as a direct current generator, and, on the other hand, if the machine is supplied with direct current energy the induction component acts as a generator and the direct current component as a motor. It has heretofore been usual to build the induction converter with the primary winding of the induction machine and the exciting winding of the direct current machine on the stator member, and to provide the rotor with a commutated direct current armature winding having equalizing connections for providing complete short-circuits for the secondary currents of the induction machine. In accordance with my present invention, I provide the rotor member of the induction converter with two independent windings, one of which is an $n$-pole commutated direct current armature winding and the other a $2n$-pole alternating current winding provided with slip rings and adapted to operate as the primary winding of the induction component of the converter. On the stator, I arrange an exciting winding and a neutralizing winding, and in accordance with my present invention I so connect the coils of these windings that each forms a complete short-circuited secondary winding for the $2n$-pole alternating current rotor-winding. When the converter is to be started from a single-phase source of alternating current I further provide the stator with an alternating current winding to be used for starting purposes.

Figure 2:
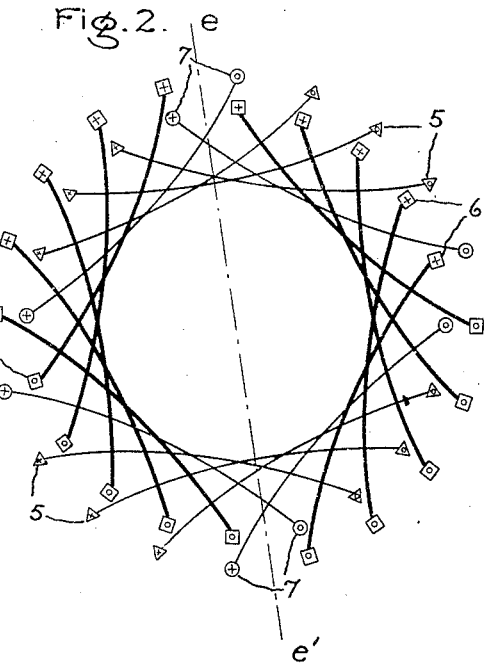
Figure 3:
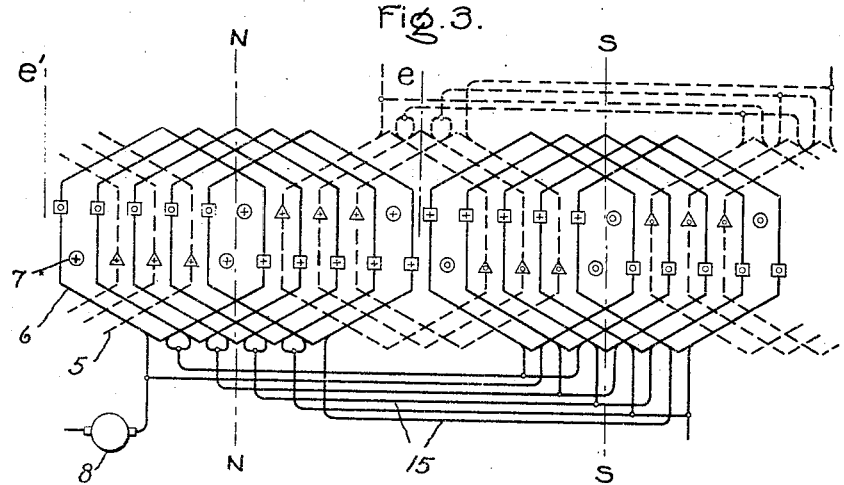

The novel features of the invention which I believe to be patentable are definitely indicated in the appended claims. The construction and mode of operation of my improved converter will be clearly understood from the following description taken in conjunction with the accompanying drawings, in which:

Figure 1 is a diagrammatic view of my improved induction converter, and Figs. 2 and 3 are explanatory diagrams of the stator winding of the converter.

Referring first to Fig. 1 of the drawings, I have therein diagrammatically represented an induction converter embodying my present invention. This converter comprises an $n$-pole direct current exciting winding 5 and an $n$-pole direct current neutralizing or compensating winding 6 arranged in distributed slots of the stator member. When the converter is to be started with single phase alternating current energy the stator also carries an $n$-pole alternating current starting winding 7. The rotor member of the converter carries two independent windings, one of which is a direct current commutated armature winding 8 of $n$ poles and the other an alternating current inducing winding 9 of $2n$ poles. The inducing winding corresponds to the primary winding of an induction machine and is provided with slip rings 10 and coöperating brushes 11 for connection to the alternating current circuit 12. Preferably, the inducing winding is arranged in the bottom of the rotor slots beneath the armature winding 8.

The arrangement of the three stator windings, 5, 6 and 7 is diagrammatically illustrated in Figs. 2 and 3. In these figures the triangles represent the conductors of the direct current exciting winding 5, the squares represent the conductors of the direct current neutralizing winding 6, and the circles represent the conductors of the alternating current starting winding 7. In the particular example illustrated in Figs. 2 and 3 for explanatory purposes the three stator windings 5, 6 and 7 are bi-polar, but it will of course be understood that the principle of the arrangement of these stator windings may be applied to any number of poles ($n$). Current distribution in the various conductors of the three stator windings is shown by means of the usual convention, in which crosses and dots applied to the conductors indicate, respectively, that the current is flowing away from or toward the observer. In Fig. 2 the exciting axis is represented by the line $e-e'$, while in the developed view of Fig. 3 the centers of the two pole faces or polar axes are represented by the lines N—N and S—S.

The three stator windings 5, 6 and 7 are composed of uniform coils of 50 per cent. pitch with respect to $n$ poles. These uniform coils are assembled in the stator slots as a two-layer lap winding, so that while electrically the stator winding of the converter is composed of three distinct and independent windings, mechanically the coils of these three windings are interleaved to form a single winding resembling the primary winding of an induction motor. The machine represented in Figs. 2 and 3 has twenty stator slots. Each of these slots contains conductors of the neutralizing winding 6. The exciting winding 5 occupies six slots per pole and the starting winding 7 four slots per pole. It will be observed that while the coils of these windings are of 50 per cent. pitch, they are assembled so that each winding is an equivalent full pitch winding Each of the three stator windings 5, 6 and 7 is provided with multiple connections 15 arranged to connect together corresponding coils similarly situated with respect to the polar arcs or pole faces. These multiple connections provide complete short-circuits with respect to $2n$ poles and thereby enable each of the stator windings to serve as a secondary or induced winding of the alternating current component of the converter. The arrangement of the multiple connections 15 is shown in Fig. 3 of the drawings. The coils of the neutralizing winding 6 are shown in full lines and the coils of the exciting winding 5 are shown in dotted lines. The coils of the starting winding 7 have been indicated by the circles in the figure, but in order to simplify the drawings the connections of these coils have not been shown, but it is to be understood that the four coils of this winding are provided with multiple connections in exactly the same manner as the neutralizing and exciting windings. The effect of the multiple connections is to connect similarly situated coils of each of the three stator windings 5, 6 and 7 in parallel, so that each stator winding is in effect a two-circuit winding. This in no way interferes with the electrical characteristics of the windings, but merely short-circuits each pair of parallel-connected coils with respect to $2n$ poles.

The operation of my improved converter is as follows. Assuming that the converter is to be started from the A. C. circuit 12, the switch 16 is closed and the switch 17 thrown to its starting or right-hand position. The starting winding 7, the neutralizing winding 6, and the armature winding 8 are thereby connected in series with one another and across the A. C. circuit 12. The converter starts as an $n$-pole compensated alternating current series motor. When up to speed, the switch 17 is thrown to its running or left-hand position, and the switch 16 may or may not be opened. The rotor inducing winding 10 is thereby connected across the A. C. circuit 12 and coöperating with the three stator windings and their multiple connections operates as a $2n$-pole, single phase induction motor with a short-circuited secondary winding. The exciting winding 5 with its controlling rheostat 18 is connected directly across the D. C. circuit 13, and the neutralizing winding 6 and armature winding 8 are connected in series with one another and across the D. C. circuit 13. The exciting winding 5, the neutralizing winding 6 and the armature winding 8 constitute the direct current component of the converter, and together operate as an $n$-pole compensated shunt generator to deliver direct current energy to the circuit 13. It will of course be understood that the converter may be operated to convert direct current energy into alternating current energy.

An advantage, incident to the construction of this type of converter having the alternating current inducing winding such as I have shown at 10 on the rotor, is the diminution of the pulsating effect on the rotor of a bi-polar machine. If the inducing winding is on the stator, in bi-polar machines, the alternate attractions and repulsions of the rotor caused by the reversals in polarity of stator winding occur with the frequency of the the line current, causing an objectionably rapid vibration or pulsation of the rotor in such machines; whereas if the alternating current inducing winding is on the rotor, these attractions and repulsions of the rotor, giving rise to pulsations, occur only with the frequency of slip and disappear entirely at synchronous speed.

Having now described one embodiment of my invention for purposes of illustration in compliance with the patent statutes, I would have it understood that I do not mean to be limited thereby to the precise details here shown since obvious changes will occur to those skilled in the art, nor in the choice of recognized equivalents except as defined in my claims hereunto annexed.

What I claim as new and desire to secure by Letters Patent of the United States, is,—

1. A combined direct current and alternating current dynamo electric machine comprising in combination, a stator member having a plurality of distributed slots, a direct current exciting winding, a direct current neutralizing winding, and an alternating current starting winding, said windings being arranged in said slots so as to form mechanically a single winding, a rotor member having a commuted winding, and a separate alternating current inducing winding and connections for completing both the alternating and direct current components of the machine.

2. A combined direct current and alternating current dynamo electric machine comprising in combination, a stator member having a plurality of distributed slots, a direct current exciting winding, a direct current neutralizing winding, and an alternating current starting winding, said windings being arranged in said slots so as to form mechanically a single winding, a rotor member having a commuted winding, and a separate alternating current inducing winding, coöperating brushes for said commuted winding adapted to be connected to a direct current source in series with said neutralizing winding, and independent connections for said inducing winding.

3. A combined direct current and alternating current dynamo electric machine comprising in combination, a stator member having a plurality of distributed slots, a direct current exciting winding, a direct current neutralizing winding, and an alternating current starting winding, said windings being arranged in said slots so as to form mechanically a single winding, a rotor member having a commuted winding, a separate alternating current inducing winding, and coöperating brushes for said commuted winding; said neutralizing winding being connected in series therewith, said exciting winding being in shunt therewith, and independent connections on said rotor member for said inducing winding.

4. A combined direct current and alternating current dynamo electric machine comprising in combination, a stator member having a plurality of distributed slots, a direct current exciting winding, a direct current neutralizing winding, and an alternating current starting winding, said windings being arranged in said slots so as to form mechanically a single winding, a rotor member having a commuted winding, a separate alternating current inducing winding, and coöperating brushes for said commuted winding, said neutralizing winding being connected in series therewith, said exciting winding being in shunt therewith, said starting winding being connected to said commuted winding for series operation, and independent connections on said rotor member for said inducing winding.

5. A combined direct current and alternating current dynamo electric machine comprising in combination, a stator member having a plurality of distributed slots, an $n$-pole direct current exciting winding, an $n$-pole direct current neutralizing winding, and an $n$-pole alternating current starting winding, said windings being composed of uniform coils assembled on said stator as a two-layer lap winding, a rotor member having a commuted winding, and a separate $2n$-pole alternating current inducing winding and connections for completing both the alternating and direct current circuits of the machine.

6. A combined direct current and alternating current dynamo electric machine comprising in combination, a stator member having a plurality of distributed slots, an $n$-pole direct current exciting winding, an $n$-pole direct current neutralizing winding, and an $n$-pole alternating current starting winding, said windings being composed of uniform coils assembled on said stator as a two-layer lap winding; said coils having a fifty per cent. pitch, there being multiple connection between similarly situated coils on each pole, a rotor member having a commuted winding, and a separate $2n$-pole alternating current inducing winding, and connections for completing both the alternating and direct current circuits of the machine.

7. The combination with a converter having a stator member provided with a direct current exciting winding, a direct current neutralizing winding and an alternating current starting winding, and a rotor member provided with a commuted winding and an independent alternating current inducing winding; of means comprising switches, and connections whereby, in one position said means is adapted to connect said starting winding across an alternating current circuit, and in another position said means is adapted to connect said direct current windings and commuted windings in operative relation across a direct current circuit and said alternating current inducing winding independently across the alternating current circuit.

In witness whereof I have hereunto set my hand this 21st day of December, 1917.

WILLEM C. KORTHALS-ALTES.